US012445149B2

(12) United States Patent
Robert Safavi et al.

(10) Patent No.: US 12,445,149 B2
(45) Date of Patent: Oct. 14, 2025

(54) COMMUNICATION DEVICES AND METHODS FOR ITERATIVE CODE DESIGN

(71) Applicant: Huawei Technologies Co., Ltd., Shenzhen (CN)

(72) Inventors: Anahid Robert Safavi, Kista (SE); Branislav M. Popovic, Kista (SE); Alberto Giuseppe Perotti, Segrate (IT)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/944,811

(22) Filed: Sep. 14, 2022

(65) Prior Publication Data
US 2023/0020591 A1    Jan. 19, 2023

Related U.S. Application Data

(63) Continuation of application No. PCT/EP2020/057964, filed on Mar. 23, 2020.

(51) Int. Cl.
*H03M 13/11* (2006.01)
*H03M 13/00* (2006.01)
*H04L 1/00* (2006.01)

(52) U.S. Cl.
CPC ...... *H03M 13/1111* (2013.01); *H03M 13/611* (2013.01); *H04L 1/0041* (2013.01); *H04L 1/005* (2013.01)

(58) Field of Classification Search
CPC ............ H03M 13/1111; H03M 13/611; H03M 13/3761; H03M 13/6306; H04L 1/0041; H04L 1/005; H04L 1/1812; H04L 1/0057
See application file for complete search history.

(56) References Cited

U.S. PATENT DOCUMENTS

2007/0064640 A1*  3/2007  Grilli ................... H04W 52/48
                                                    370/320
2008/0301518 A1   12/2008  Miyazaki
(Continued)

FOREIGN PATENT DOCUMENTS

WO    2017091244 A1    6/2017
WO    2020064116 A1    4/2020

OTHER PUBLICATIONS

Jiang, Y. et al., "LEARN Codes: Inventing low-latency codes via recurrent neural networks," IEEE International Conference on Communications (ICC), Jul. 15, 2019, 7 pages.
(Continued)

*Primary Examiner* — Sudesh M. Patidar
(74) *Attorney, Agent, or Firm* — Slater Matsil, LLP

(57) ABSTRACT

A first communication device and a second communication device for an iterative code design are provided. The first communication device generates and transmits sets of parity symbols and receives the transmitted sets of parity symbols from a second communication device. The sets of parity symbols are generated based on using a first generator device and based on previously transmitted systematic symbols and computed noise values. The second communication device buffers received systematic symbols and sets of parity symbols and jointly decodes them. Thereby, an iterative code design is provided with improved performance. Furthermore, the disclosure also relates to corresponding methods and a computer program.

14 Claims, 13 Drawing Sheets

(56) References Cited

U.S. PATENT DOCUMENTS

| | | | |
|---|---|---|---|
| 2010/0232550 A1* | 9/2010 | Lee | H04L 27/06 |
| | | | 375/341 |
| 2015/0128013 A1* | 5/2015 | Okamura | H03M 13/1117 |
| | | | 714/776 |
| 2020/0059926 A1* | 2/2020 | Jiang | H04W 72/51 |
| 2020/0089214 A1* | 3/2020 | Cella | H04Q 9/00 |
| 2020/0273268 A1* | 8/2020 | Bhattacharyya | |
| | | | G06Q 10/06315 |
| 2020/0295810 A1* | 9/2020 | Baldemair | H04L 1/1864 |

OTHER PUBLICATIONS

Kim, H. et al., "Deepcode: Feedback Codes via Deep Learning," arXiv:1807.00801v1 [cs.LG] 2, Department of Electrical Engineering at the University of Washington, Jul. 2018, 24 pages.

Polyanski, Y. et al., "Feedback in the Non-Asymptotic Regime," IEEE Transactions on Information Theory, vol. 57, No. 8, Aug. 2011, 23 pages.

Schalkwijk, J.P.M. et al., "A Coding Scheme for Additive Noise Channels with Feedback—Part 1: No Bandwidth Constraint," IEEE Transactions on Information Theory, vol. IT-12, No. 2, Apr. 1966, 11 pages.

Shannon. C.E., "The Zero Error Capacity of a Noisy Channel," IRE Transactions on Information Theory, vol. 2, Issue: 3, Sep. 1956, 12 pages.

\* cited by examiner

COMMUNICATION DEVICES AND METHODS FOR ITERATIVE CODE DESIGN

CROSS-REFERENCE TO RELATED APPLICATIONS

This application is a continuation of International Application No. PCT/EP2020/057964, filed on Mar. 23, 2020, the disclosure of which is hereby incorporated by reference in its entirety.

TECHNICAL FIELD

The disclosure relates to a first communication device and a second communication device for iterative code design. Furthermore, the disclosure also relates to corresponding methods and a computer program.

BACKGROUND

Current 3GPP fifth generation (5G) standard, also called new radio (NR), even though satisfying various requirements, relies heavily on previous conventional design inherited from previous generations, where physical layer modules are designed and optimized separately for services providing high spectral efficiency (SE) and high data rates.

As 5G standardization goes on, difficulties to achieve new metrics corresponding to newly defined services arises. For instant, a typical ultra-reliable low-latency communication/industrial internet of things (URLLC/IIOT) application for future generation would need a considerable higher reliability and/or shorter transmission delays for finite block length packets. Theoretical results indicate that the way to get higher reliability for shorter packet transmission is to exploit efficiently channel output feedback to the transmitter.

Conventional wireless communication systems designed mainly to provide high data rates are using linear codes such as turbo codes and low density parity check (LDPC) codes. As for the feedback mechanism, the well-known hybrid automatic repeat request (HARQ) feedback is used as a method to enable re-transmission of the same or another part of an initially generated code word upon decoding failure. In the receiver, soft combining of the received coded bits increases reliability. HARQ type feedback limits the gain that could be theoretically obtained by fully taking advantage of channel output feedback.

SUMMARY

An objective of examples of the disclosure is to provide a solution which mitigates or solves the drawbacks and problems of conventional solutions.

The above and further objectives are solved by the subject matter of the independent claims. Further advantageous examples of the disclosure can be found in the dependent claims.

According to a first aspect of the disclosure, the above mentioned and other objectives are achieved with a first communication device for a wireless communication system, the first communication device being configured to obtain a first set of noise values based on a set of systematic symbols transmitted in a first channel to a second communication device and a set of corresponding systematic symbols received in a second channel from the second communication device, wherein the set of systematic symbols are associated with a set of information symbols corresponding to a set of information bits and being indexed from k=1, 2, ..., K where k is an integer; for k=1: generate a first set of parity symbols $P_1$ using a first generator device and based on the first systematic symbol in the set of systematic symbols and a first noise value in the first set of noise values, transmit the first set of parity symbols $P_1$ in the first channel to the second communication device, receive a first set of corresponding parity symbols $P_1$ in the second channel from the second communication device; and for k=2, ..., K: obtain a k−1th set of noise values based on a set of k−1th transmitted parity symbols $P_{k-1}$ and a set of k−1th received parity symbols, generate a k-th set of parity symbols $P_k$ using the first generator device and based on k-th systematic symbol, k-th to k−$\Delta^{tx}$th noise values in the first set of noise values, and k−1 to k−1−$\gamma_l^{tx}$th sets of noise values, where $\Delta^{tx}$ and $\gamma_l^{tx}$ are integers and $\gamma_l^{tx}$ corresponds to the l-th parity symbol where l=1, 2, ..., P and P is the number of parity symbols per information bit of the set of information bits, transmit the k-th set of parity symbols $P_k$ in the first channel to the second communication device, and receive a k-th set of corresponding parity symbols $\tilde{P}_k$ in the second channel from the second communication device.

That the set of systematic symbols are associated with a set of information symbols corresponding to a set of information bits can be understood that the set of information bits are modulated using a modulation scheme such as a conventional modulation scheme. The information symbols are not encoded further and are therefore denoted as systematic symbols.

To receive a k-th set of corresponding parity symbols $\tilde{P}_k$ can be understood that the second communication device echoes back the k-th set of parity symbols PR received from the first communication device. Hence, the set of corresponding parity symbols can be considered as the noisy transmitted parity symbol $P_k$. More precisely $\tilde{P}_k$ is transmitted parity symbol $P_k$ including the noise on the first (also known as forward) channel and the noise on the second (also known as feedback) channel.

Therefore, an iterative code design is provided comprising transmission and reception between the first and second communication devices. An advantage of the first communication device according to the first aspect is that a gain of one order of magnitude in an error rate (such as BLER) can be obtained in the wireless communication system.

In an implementation form of a first communication device according to the first aspect, $\Delta^{tx}$ is equal to 1.

An advantage of this implementation form is that a gain of one order of magnitude in an error rate is obtained for the same vale of $\Delta^{tx}$ and any conventional modulation order.

In an implementation form of a first communication device according to the first aspect, $\gamma_1^{tx}$ is equal to 1 and $\gamma_2^{tx}$ is equal to 0 when P is equal to 2.

An advantage of this implementation form is that a gain of one order of magnitude in an error rate is obtained for the same value and any modulation order.

In an implementation form of a first communication device according to the first aspect, the first generator device is configured to
  generate the k-th set of parity symbols $P_k$ further based on
    a previous time instant of the first generator device.

The first generator device may be a device that at any given time instant, produces an output based on its input and internal state. Further, the internal state may be updated before moving to the next time instant. The first generator device may be defined by a list of states, its initial state and the inputs that trigger transition to another state.

An advantage of this implementation form is that there is a memory between the parity symbols generated in different time instants. This permit to have a large set of dependencies and to mimic an effective coding of information using these dependencies Dependencies can herein mean correlation between parity symbols generated at different time instants due to the state of the first generator device. Thereby, a strong code can be designed.

In an implementation form of a first communication device according to the first aspect, wherein the first generator device is a recurrent neural network including a one layer gated recurrent unit, a linear transformer and a linear activation function.

An advantage of this implementation form of having the linear activation function instead of non-linear activation function is reducing implementation complexity. Additionally, having linear activation function permits to have the parity symbols with larger values avoiding saturation when higher order modulation is used. Using one layer gated recurrent unit instead of two layer gated recurrent unit permits less complex implementation. Linear transformer permits to generate different number of parity symbols from the output of gated recurrent unit and therefore enable obtaining different rates.

In an implementation form of a first communication device according to the first aspect, the first communication device being configured to transmit a control message to the second communication device, wherein the control message indicates K and P.

An advantage of this implementation form is that both the transmitter, i.e. the first communication device, and the receiver, i.e. the second communication device, have the same information of encoder and decoder structure for a considered spectral efficiency or coding rate.

In an implementation form of a first communication device according to the first aspect, the control message further indicates a first parameter $\Delta^{rx}$ denoting a time window for received systematic symbols and a second parameter $\gamma_l^{rx}$ denoting a time window for received parity symbols.

An advantage of this implementation form is to obtain information about decoder structure to obtain certain performance at the second communication device.

According to a second aspect of the disclosure, the above mentioned and other objectives are achieved with a second communication device for a wireless communication system, the second communication device being configured to receive a set of systematic symbols in a first channel from a first communication device, wherein the set of systematic symbols correspond to a set of information symbols corresponding to a set of information bits and being indexed from k=1, 2, ..., K where k is an integer, transmit the set of received systematic symbols in a second channel to the first communication device; and for k=1, 2, ..., K: receive a k-th set of parity symbols $P_k$ in the first channel from the first communication device, transmit a k-th set of corresponding parity symbols $\tilde{P}_1$ in the second channel to the first communication device, and determine a k-th information symbol using a second generator device and based on k-th to k−$\Delta^{rx}$th received systematic symbols and k-th to k−$\gamma_l^{rx}$th received parity symbols, where $\Delta^{rx}$ and $\gamma_l^{rx}$ are integers and $\gamma_l^{rx}$ corresponds to the l-th parity symbol where l=1, 2, ..., P and P is the number of parity symbols per information bit of the set of information bits.

An advantage of the second communication device according to the second aspect is that this implementation permit to achieve a one order of magnitude of gain in an error rate, such as BLER, with an implementation that exhibits lower complexity.

An advantage with this implementation form is that the same value can be considered for any modulation order and a general structure can hence be defined.

In an implementation form of a second communication device according to the second aspect, $\gamma_1^{rx}$ is equal to and $\gamma_2^{rx}$ is equal to 0 or 1 when P is equal to 2.

In an implementation form of a second communication device according to the second aspect, $\Delta^{rx}$ is equal to 1 or 2.

An advantage with this implementation form is that the same value can be considered for any modulation order and a general structure can hence be defined.

In an implementation form of a second communication device according to the second aspect, $\gamma_1^{rx}$ is equal to and $\gamma_2^{rx}$ is equal to 0 or 1 when P is equal to 2.

An advantage with this implementation form is that the same value can be considered for any modulation order and a general structure can hence be defined.

In an implementation form of a second communication device according to the second aspect, the second generator device being configured to determine the k-th information symbol further based on a previous time instant and a consecutive time instant of the second generator device.

The second generator device may be a device that at any given time instant, produces an output based on its input and internal state. Further, the internal state may be updated before moving to the next time instant. The second generator device may be defined by a list of states, its initial state and the inputs that trigger transition to another state.

An advantage with this implementation form is that there is a memory between different time instants that enable decoding of the encoded sequence. Information symbols is obtained considering previous and consecutive state to enable more reliable decoding.

In an implementation form of a second communication device according to the second aspect, the second generator device is a recurrent neural network including a bi-directional one layer gated recurrent unit, a linear transformer and a linear activation function.

An advantage with this implementation form is that the linear activation function is less computationally complex compared to non-linear activation function. Additionally, linear activation function permits to have larger values and avoids saturation for higher order modulation. One layer bi-directional gated recurrent unit has a considerable less computational complexity compared to two layer bi-directional gated recurrent unit. Linear transformer can guarantee consideration of different codes rates for the encoder and decoder.

In an implementation form of a second communication device according to the second aspect, the second communication device being configured to receive a control message from the first communication device, wherein the control message indicates K and P.

An advantage with this implementation form is that both the transmitter, i.e. the first communication device, and the receiver, i.e. the second communication device, have the same understanding of decoder encoder structure.

In an implementation form of a second communication device according to the second aspect, wherein control message further indicates a first parameter $\Delta^{rx}$ denoting a time window for received systematic symbols and a second parameter $\gamma_l^{rx}$ denoting a time window for received parity symbols.

An advantage with this implementation form is to obtain information from decoder structure to obtain certain performance at the second communication device.

According to a third aspect of the disclosure, the above mentioned and other objectives are achieved with a method for a first communication device, the method comprises obtaining a first set of noise values based on a set of systematic symbols transmitted in a first channel to a second communication device and a set of corresponding systematic symbols received in a second channel from the second communication device, wherein the set of systematic symbols are associated with a set of information symbols corresponding to a set of information bits and being indexed from k=1, 2, ..., K where k is an integer. For k=1: generating a first set of parity symbols $P_1$ using a first generator device and based on the first systematic symbol in the set of systematic symbols and a first noise value in the first set of noise values, transmitting the first set of parity symbols $P_1$ in the first channel to the second communication device, receiving a first set of corresponding parity symbols $P_1$ in the second channel from the second communication device. For k=2, ..., K: obtaining a k−1th set of noise values based on a set of k−1th transmitted parity symbols $P_{k-1}$ and a set of k−1th received parity symbols, generating a k-th set of parity symbols $P_k$ using the first generator device and based on k-th systematic symbol, k-th to k−$\Delta^{tx}$th noise values in the first set of noise values, and k−1 to k−1−$\gamma_l^{tx}$th sets of noise values, where $\Delta^{tx}$ and $\gamma_l^{tx}$ are integers and $\gamma_l^{tx}$ corresponds to the l-th parity symbol where l=1, 2, ..., P and P is the number of parity symbols per information bit of the set of information bits, transmitting the k-th set of parity symbols $P_k$ in the first channel to the second communication device, and receiving a k-th set of corresponding parity symbols $P_k$ in the second channel from the second communication device.

The method according to the third aspect can be extended into implementation forms corresponding to the implementation forms of the first communication device according to the first aspect. Hence, an implementation form of the method comprises the feature(s) of the corresponding implementation form of the first communication device.

The advantages of the methods according to the third aspect are the same as those for the corresponding implementation forms of the first communication device according to the first aspect.

According to a fourth aspect of the disclosure, the above mentioned and other objectives are achieved with a method for a second communication device, the method comprises receiving a set of systematic symbols in a first channel from a first communication device, wherein the set of systematic symbols correspond to a set of information symbols corresponding to a set of information bits and being indexed from k=1, 2, ..., K where k is an integer, transmitting the set of received systematic symbols in a second channel to the first communication device; and for k=1, 2, ..., K: receiving a k-th set of parity symbols $P_k$ in the first channel from the first communication device, transmitting a k-th set of corresponding parity symbols $\tilde{P}_1$ in the second channel to the first communication device, and determining a k-th information symbol using a second generator device and based on k-th to k−$\Delta^{rx}$th received systematic symbols and k-th to k−$\gamma_l^{rx}$th received parity symbols, where $\Delta^{rx}$ and $\gamma_l^{rx}$ are integers and $\gamma_l^{rx}$ corresponds to the l-th parity symbol where l=1, 2, ..., P and P is the number of parity symbols per information bit of the set of information bits.

The method according to the fourth aspect can be extended into implementation forms corresponding to the implementation forms of the second communication device according to the second aspect. Hence, an implementation form of the method comprises the feature(s) of the corresponding implementation form of the second communication device.

The advantages of the methods according to the fourth aspect are the same as those for the corresponding implementation forms of the second communication device according to the second aspect.

The disclosure also relates to a computer program, characterized in program code, which when run by at least one processor causes said at least one processor to execute any method according to examples of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the examples of the disclosure will be apparent from the following detailed description.

BRIEF DESCRIPTION OF THE DRAWINGS

The appended drawings are intended to clarify and explain different examples of the disclosure, in which.

DETAILED DESCRIPTION OF ILLUSTRATIVE EMBODIMENTS

Figure 1:
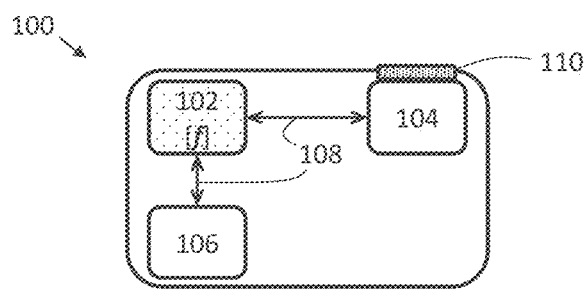
FIG. 1 shows a first communication device according to an example embodiment.

A conventional code for channels with feedback is a non-linear code that maps current information bits and received feedback to a signal to be transmitted in a current time interval. Intuitively, such a nonlinear code would be difficult to obtain using conventional code-design approaches. In this context, machine-learning methods employing deep neural networks that by essence permit optimization of performance by producing any linear or non-linear encoder are considered as a promising code design method. Additionally, a feedback code designed using neural networks can be potentially concatenated with linear codes using conventional HARQ feedback to increase further the reliability and thereby satisfying the tight reliability requirements for future generation wireless networks.

With reference to the previous section a possible approach to code design is to use so called recurrent neural networks (RNNs) in the encoder and decoder. Indeed, such structures have a memory or a hidden state that can keep track of previous inputs. Therefore, it is possible to create new output by jointly mapping information bits and previously received feedback using RNN memory to perform encoding in an iterative manner. Such a strategy has been exploited and it is known that this strategy alone is not enough to achieve good performance with respect to conventional approaches. Instead, it has been shown that a multi-step retransmission on the erasure channel with feedback achieves capacity.

Following this approach, the transmitted bits are either received perfectly or erased, and erasure locations are fed back to the transmitter. In such a channel one can first transmit a block of un-coded symbols and then transmit in the following steps whichever symbols were erased in the previous block. This motivates a two-phase scheme, where un-coded or systematic bits or symbols are sent in the first phase and then based on the feedback in the first phase, coded or parity bits or symbols are sent in the second phase. Thus, the code only needs to be designed for the second phase.

Conventional encoder and decoder architecture based on neural network design of conventional solutions does not permit to achieve very high reliability or low block error rate (BLER) that is required for future wireless communication systems. Additionally, proposed decoders of conventional solutions have considerable computational complexity due to the large amount of trained variables that are needed in such decoders. This would ultimately lead to large training time and hence high latency. Further, conventional encoder and decoder architecture does not consider how or if the conventional solutions developed for binary shift keying (BPSK) modulation can be adapted to higher order modulation and/or higher spectral efficiency, and thus be used for conventional modulation of wireless systems.

A new encoder and decoder architecture for neural network is therefore proposed and evaluated in the disclosure. The solution can be considered to be based sequential iterative codes (SIC) but is not limited thereto. Generally speaking, the code design principle herein can be considered to at least partially rely on exploiting the memory of a recurrent neural network by sending the most recent and past parity and systematic symbols to the encoder input. The same general principles are used in the decoder input meaning that most recent and past received noisy systematic and parity symbols are sent to the decoder. The proposed solution can be applied to higher order modulation schemes as well. Therefore, a uniform encoder and decoder architecture for different modulation orders can be designed suitable for conventional and future wireless systems, such as LTE and NR.

FIG. 1 shows a first communication device 100 according to an example embodiment. In the example shown in FIG. 1, the first communication device 100 comprises a first generator device 102, a transceiver 104 and a memory 106. The first generator device 102 may be coupled to the transceiver 104 and the memory 106 by communication means 108 known in the art. The first communication device 100 may further comprise an antenna or antenna array 110 coupled to the transceiver 104, which means that the first communication device 100 may be configured for wireless communications in a wireless communication system. That the first communication device 100 may be configured to perform certain actions can in this disclosure be understood to mean that the first communication device 100 comprises suitable means, such as e.g. the first generator device 102 and the transceiver 104, configured to perform said actions.

The first generator device 102 of the first communication device 100 may be referred to as one or more general-purpose central processing units (CPUs), one or more digital signal processors (DSPs), one or more application-specific integrated circuits (ASICs), one or more field programmable gate arrays (FPGAs), one or more programmable logic devices, one or more discrete gates, one or more transistor logic devices, one or more discrete hardware components, and one or more chipsets. The memory 106 of the first communication device 100 may be a read-only memory, a random access memory, or a non-volatile random access memory (NVRAM). The transceiver 104 of the first communication device 100 may be a transceiver circuit, a power controller, an antenna, or an interface which communicates with other modules or devices. In examples, the transceiver 104 of the first communication device 100 may be a separate chipset or being integrated with the first generator device 102 in one chipset. While in some examples, the first generator device 102, the transceiver 104, and the memory 106 of the first communication device 100 are integrated in one chipset.

Figure 5:
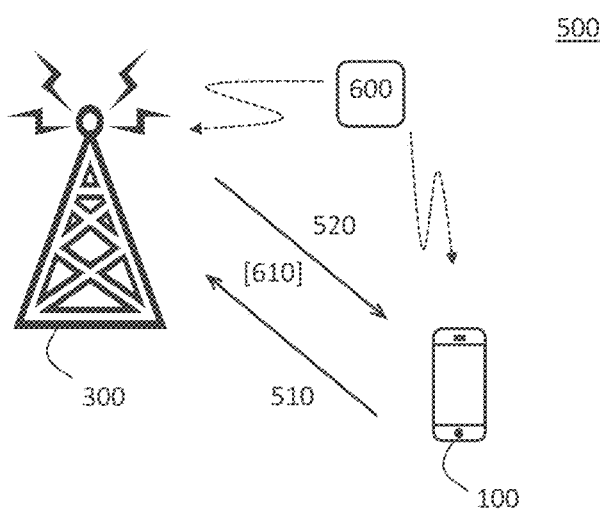
FIG. 5 shows a wireless communication system according to an example embodiment.
Figure 6:
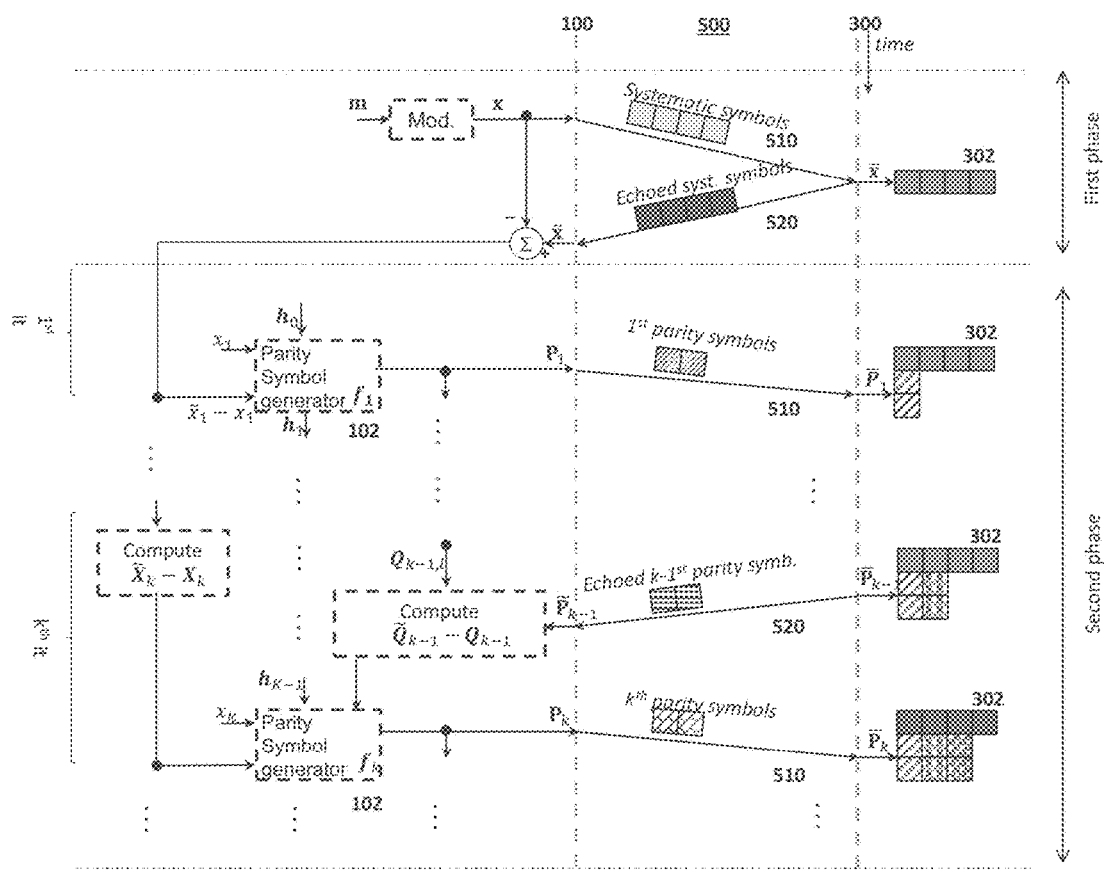
FIG. 6 illustrates the interaction between first communication device and a second communication device in a wireless communication system according to an example embodiment.

According to example embodiments the first communication device 100 is configured to obtain a first set of noise values based on a set of systematic symbols transmitted in a first channel 510 to a second communication device 300 and a set of corresponding systematic symbols received in a second channel 520 from the second communication device 300, see FIGS. 5 and 6. The set of systematic symbols are associated with a set of information symbols corresponding to a set of information bits and being indexed from k=1, 2, . . . , K where k is an integer.

The first communication device 100 is further configured to, for k=1: generate a first set of parity symbols $P_1$ using a first generator device 102 and based on the first systematic symbol in the set of systematic symbols and a first noise value in the first set of noise values, transmit the first set of parity symbols $P_1$ in the first channel 510 to the second communication device 300, and receive a first set of corresponding parity symbols $\tilde{P}_1$ in the second channel 520 from the second communication device 300. For k=2, . . . , K: obtain a k−1th set of noise values based on a set of k−1th transmitted parity symbols $P_{k-1}$ and a set of k−1th received parity symbols, generate a k-th set of parity symbols $P_k$ using the first generator device 102 and based on k-th systematic symbol, k-th to k−$\Delta^{tx}$th noise values in the first set of noise values, and k−1 to k−1−$\gamma_l^{tx}$th sets of noise values, where $\Delta^{tx}$ and $\gamma_l^{tx}$ are integers and $\gamma^{tx}$ corresponds to the l-th parity symbol where l=1, 2, . . . , P and P is the number of parity symbols per information bit of the set of information bits, transmit the k-th set of parity symbols $P_k$ in the first channel 510 to the second communication device 300, and receive a k-th set of corresponding parity symbols $\tilde{P}_k$ in the second channel 520 from the second communication device 300.

The first communication device 100 is configured to repeat steps i) to iv) until k=K.

Figure 2:
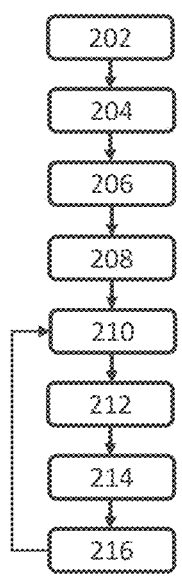
FIG. 2 shows a method for a second communication device according to an example embodiment.

FIG. 2 shows a flow chart of a corresponding method 200 which may be executed in a first communication device 100, such as the one shown in FIG. 1. The method 200 comprises obtaining 202 a first set of noise values based on a set of systematic symbols transmitted in a first channel 510 to a second communication device 300 and a set of corresponding systematic symbols received in a second channel 520 from the second communication device 300. The set of systematic symbols are associated with a set of information symbols corresponding to a set of information bits and being indexed from k=1, 2, . . . , K where k is an integer.

The method 200 further comprises, for k=1: generating 204 a first set of parity symbols $P_1$ using a first generator device 102 and based on the first systematic symbol in the set of systematic symbols and a first noise value in the first set of noise values, transmitting 206 the first set of parity symbols $P_1$ in the first channel 510 to the second communication device 300, receiving 208 a first set of corresponding parity symbols $\tilde{P}_1$ in the second channel 520 from the second communication device 300.

The method 200 further comprises, for k=2, . . . , K: obtaining 210 a k−1th set of noise values based on a set of k−1th transmitted parity symbols $P_{k-1}$ and a set of k−1th received parity symbols, generating 212 a k-th set of parity symbols $P_k$ using the first generator device 102 and based on k-th systematic symbol, k-th to k−$\Delta^{tx}$th noise values in the first set of noise values, and k−1 to k−1−$\gamma_l^{tx}$th sets of noise values, where $\Delta^{tx}$ and $\gamma_l^{tx}$ are integers and $\gamma_l^{tx}$ corresponds to the l-th parity symbol where l=1, 2, . . . , P and P is the number of parity symbols per information bit of the set of information bits, transmitting 214 the k-th set of parity symbols $P_k$ in the first channel 510 to the second communication device 300, and receiving 216 a k-th set of corresponding parity symbols $\tilde{P}_k$ in the second channel 520 from the second communication device 300.

Hence, steps 210 to 216 are repeated in method 200 until k=K.

Figure 3:
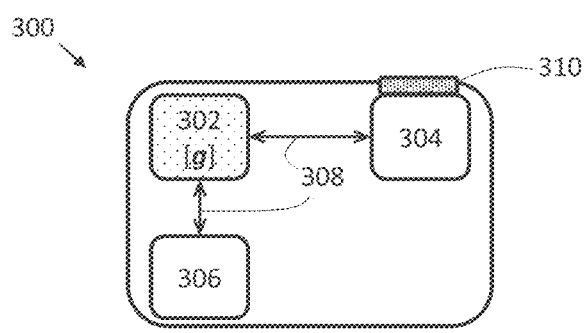
FIG. 3 shows a second communication device according to an example embodiment.

FIG. 3 shows a second communication device 300 according to an example embodiment. In the example shown in FIG. 3, the second communication device 300 comprises a second generator device 302, a transceiver 304 and a memory 306.

The second generator device 302 is coupled to the transceiver 304 and the memory 306 by communication means 308 known in the art. The second communication device 300 may be configured for wireless communications in the wireless communication systems.

The wireless communication capability is provided with an antenna or antenna array 310 coupled to the transceiver 304.

That the second communication device 300 is configured to perform certain actions can in this disclosure be understood to mean that the second communication device 300 comprises suitable means, such as e.g. the second generator device 302 and the transceiver 304, configured to perform said actions.

The second generator device 302 of the second communication device 300 may be referred to as one or more general-purpose CPUs, one or more DSPs, one or more ASICs, one or more FPGAs, one or more programmable logic devices, one or more discrete gates, one or more transistor logic devices, one or more discrete hardware components, and one or more chipsets.

The memory 306 of the second communication device 300 may be a read-only memory, a random access memory, or a NVRAM. The transceiver 304 of the second communication device 300 may be a transceiver circuit, a power controller, an antenna, or an interface which communicates with other modules or devices. In examples, the transceiver 304 of the second communication device 300 may be a separate chipset or being integrated with the second generator device 302 in one chipset. While in some examples, the second generator device 302, the transceiver 304, and the memory 306 of the second communication device 300 are integrated in one chipset.

According to example embodiments the second communication device 300 is configured to receive a set of systematic symbols in a first channel 510 from a first communication device 100. The set of systematic symbols correspond to a set of information symbols corresponding to a set of information bits and being indexed from k=1, 2, . . . , K where k is an integer. The second communication device 300 is further configured to transmit the set of received systematic symbols in a second channel 520 to the first communication device 100.

The second communication device 300 is further configured to, for k=1, 2, . . . , K: receive a k-th set of parity symbols $P_k$ in the first channel 510 from the first communication device 100, transmit a k-th set of corresponding parity symbols $\tilde{P}_1$ in the second channel 520 to the first communication device 100, and determine a k-th information symbol using a second generator device 302 and based on k-th to k−$\Delta^{rx}$th received systematic symbols and k-th to k−$\gamma_l^{rx}$th received parity symbols, where $\Delta^{rx}$ and $\gamma_l^{rx}$ are integers and $\gamma_l^{rx}$ corresponds to the l-th parity symbol where l=1, 2, . . . , P and P is the number of parity symbols per information bit of the set of information bits.

In examples, the second communication device 300 is configured to buffer/store the set of systematic symbols and each set of parity symbols $P_k$, for k=1, 2, . . . , K, received from the first communication device 100. The buffered set of systematic symbols and parity symbols are thereafter jointly decoded. The set of systematic symbols and each set of parity symbols $P_k$ can e.g. be buffered/stored in the memory 306.

Figure 4:
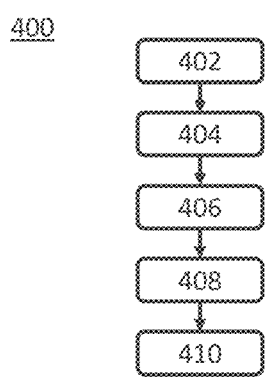
FIG. 4 shows a method for a second communication device according to an example embodiment.

FIG. 4 shows a flow chart of a corresponding method 400 which may be executed in a second communication device 300, such as the one shown in FIG. 3. The method 400 comprises receiving 402 a set of systematic symbols in a first channel 510 from a first communication device 100. The set of systematic symbols correspond to a set of information symbols corresponding to a set of information bits and being indexed from k=1, 2, . . . , K where k is an integer. The method 400 further comprises transmitting 404 the set of received systematic symbols in a second channel 520 to the first communication device 100.

The method 400 further comprises, for k=1, 2, . . . , K: receiving 406 a k-th set of parity symbols $P_k$ in the first channel 510 from the first communication device 100, transmitting 408 a k-th set of corresponding parity symbols $\tilde{P}_1$ in the second channel 520 to the first communication device 100, and determining 410 a k-th information symbol using a second generator device 302 and based on k-th to k−$\Delta^{rx}$th received systematic symbols and k-th to k−$\gamma_l^{rx}$th received parity symbols, where $\Delta^{rx}$ and $\gamma_l^{rx}$ are integers and $\gamma_l^{rx}$ corresponds to the l-th parity symbol where l=1, 2, . . . , P and P is the number of parity symbols per information bit of the set of information bits.

In examples, the method 400 comprises to buffer the set of systematic symbols and each set of parity symbols $P_k$, for k=1, 2, . . . , K, received from the first communication device 100. The buffered set of systematic symbols and parity symbols are thereafter jointly decoded.

FIG. 5 shows a wireless communication system 500 according to an example embodiment. The wireless communication system 500 comprises a first communication device 100 and a second communication device 300 configured to operate in the wireless communication system 500. For simplicity, the wireless communication system 500 shown in FIG. 5 only comprises one first communication device 100 and one second communication device 300. However, the wireless communication system 500 may comprise any number of first communication devices 100 and any number of second communication devices 300 without deviating from the scope of the disclosure. The wireless communication system in this disclosure includes but is not limited to LTE, 5G or future wireless communication system.

In FIG. 5 the first communication device 100 is illustrated as a client device and the second communication device 300 is illustrated as a network access node. However, the reverse case is possible. Therefore, the first communication device 100 can be a client device or a network access node or any other suitable communication device; and the second communication device 300 can be a client device or a network access node or any other suitable communication device.

A client device in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, an integrated access and backhaul node (LAB) such as mobile car or equipment installed in a car, a drone, a device-to-device (D2D) device, a wireless camera, a mobile station, an access terminal, an user unit, a wireless communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IoT) scenario, the client device may represent a machine or another device or chipset which performs communication with another wireless device and/or a network equipment.

The UE may further be referred to as a mobile telephone, a cellular telephone, a computer tablet or laptop with wireless capability. The UE in this context may e.g. be portable, pocket-storable, hand-held, computer-comprised, or vehicle-mounted mobile device, enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM). The UE may also be configured for communication in 3GPP related LTE and LTE-Advanced, in WiMAX and its evolution, and in fifth generation wireless technologies, such as NR.

A network access node in this disclosure includes but is not limited to: a NodeB in wideband code division multiple access (WCDMA) system, an evolutional Node B (eNB) or an evolved NodeB (eNodeB) in LTE systems, or a relay node or an access point, or an in-vehicle device, a wearable device, or a gNB in the fifth generation (5G) networks. Further, the network access node herein may be denoted as a radio network access node, an access network access node, an access point, or a base station, e.g. a radio base station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a station (STA), which is any device that contains an IEEE 802.11-conformant MAC and PHY interface to the wireless medium. The radio network access node may also be a base station corresponding to the 5G wireless systems.

FIG. 6 illustrates in more detail the interaction between the first communication device 100 and the second communication device 300 in a wireless communication system 500 according to an example embodiment. In FIG. 6 the solution may be considered as a two phase procedure which now will be described in detail.

First Phase

The first phase consists of transmission of a set systematic symbols through the forward channel, also denoted as a first channel 510 herein, and reception of corresponding echoed systematic symbols through the feedback channel, also denoted as a second channel 520 herein.

In the first communication device 100, the set of systematic symbols are obtained from a set of information bits without adding any redundancy, e.g. no coding procedure. In other words, the set of information bits are modulated to obtain the set of systematic symbols. In this respect information block vector $m=(m_1, \ldots, m_L)$ of length L bits is modulated to obtain a set of systematic symbols $x=(x_1, \ldots, x_K)$ to be transmitted over the first channel 510. The transmitted vector x is corrupted by independent Gaussian noise $n_0$ with variance $\sigma^2$ and the second communication device 300 therefore receives $$\tilde{x} = x + n_0 \qquad (1)$$

The second communication device 300 buffers/stores the received vector and echoes or feeds it back to the first communication device 100 over the second channel 520. Echoed systematic vector transmitted in the second channel 520 and received by the first communication device 100 can be written as $$\bar{x} = \tilde{x} + w_0 \qquad (2)$$

with $w_0$ being independent Gaussian noise on the second channel 520 with variance $\sigma_F^2$.

Second Phase

After the first phase a second phase is performed. The second phase consists of an iterative procedure where in iteration instant k, where $k=\{1, 2, \ldots, K\}$ one set of parity symbols $P_k$ is generated by a parity symbol generator automaton $f_k$ herein also denoted the first generator device 102 comprised in the first communication device 100.

The set of parity symbols $P_k$ at iteration instant k is denoted as:

$$P_k = \begin{bmatrix} p_{k,1} \\ p_{k,2} \\ \vdots \\ p_{k,P} \end{bmatrix} \qquad (3)$$

where $p_{k,l}$ with $1 \leq l \leq P$ denotes $l^{th}$ parity symbol of iteration k and P is the number of generated parity symbols per information bit.

The set of parity symbols transmitted over the first channel 510 is corrupted by independent Gaussian noise $n_k \sim N(0, \sigma^2)$, creating the received vector $\tilde{P}_k$ at the second communication device 300.

The received set of parity symbols $\tilde{P}_k$ is then transmitted back or echoed back to the first communication device 100 after a unit time delay via another additive white Gaussian noise channel denoted as the second channel 520, where the noise is statistically independent and Gaussian distributed $w_{k-1} \sim N(0, \sigma_F^2)$.

$$\bar{P}_{k-1} = \tilde{P}_{k-1} + w_{k-1} \qquad (4)$$

The first communication device 100 can use this feedback from the second communication device 300 to sequentially and adaptively decide/determine which set of parity symbols to transmit in the next transmission step. Additionally, the received symbol $\overline{P}_k$ is buffered in the second communication device 300 to be decoded later on which will be explained more in detail in the following disclosure.

Figure 8:
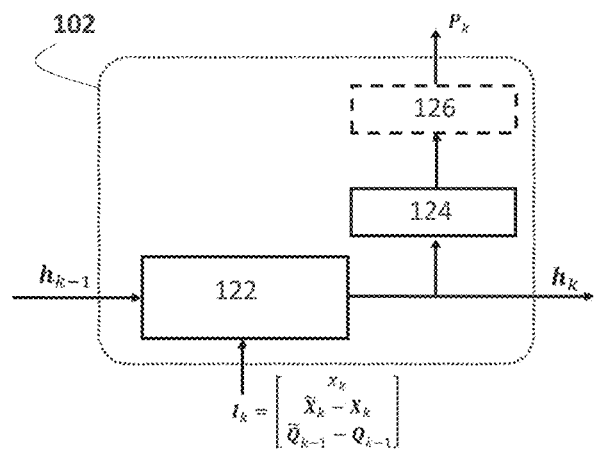
FIG. 8 illustrates a first generator device according to an example embodiment.

In examples, the first generator device 102 includes a RNN, e.g. a RNN including a one layer gated recurrent unit 122, a linear transformer 124 and a linear activation function 126, see FIG. 8.

In the first generator device 102, the output state or memory of the $k^{th}$ time instant is denoted by $h_k$. Time instant $h_k$ is a non-linear function of input state of the first generator device 102 in time instant k−1 which is denoted by $h_{k-1}$. This means that in the current time instant there is a memory about what happened in previous time instants. This particularity enables learning a large set of dependencies through consecutive states. $h_k$ is of length K and $h_0=0$.

Additional inputs to the first generator device 102 in time instant k are information symbols at time instant k denoted by $x_k$, noise on systematic symbols of instant k denoted as $\tilde{x}_k - x_k$ and also noise on previously transmitted set of parity symbols and corresponding set of parity symbols received via the second channel 520 from the second communication device 300.

The first generator device 102 can be written as a non-linear mapping function $f_k$ with $$f_k:(I_k,h_{k-1}) \rightarrow P_k \quad (5)$$

where $I_k$ denotes the actual input at time instant k to the encoder automaton which will be described in detail in the following section.

In the second phase, the iteration instant k corresponds to time instant k. In equation (4) the first communication device 100 receives a set of echoed parity symbols from the second communication device 300, that were generated previously and were transmitted at time instant k−1 from the first communication device 100 to the second communication device 520. The iterations in the second phase stops when the last iteration instant corresponding to instant k=K has been performed.

The first generator device 102 (also known as first automaton) can be considered as a device that at any given time instant, produces an output based on its input and internal state. Further, the internal state is updated before moving to the next time instant. The first generator device 102 may be defined by a list of states, its initial state and the inputs that trigger transition to another state.

Decoding

Mathematically, the second generator device 302 (also known as a decoder automate) can be seen as a non-linear mapping function g that maps the received sequence $\overline{y}$ into estimated information symbols according to:

$$g:\overline{y} \rightarrow \hat{x} \quad (6)$$

Figure 7:
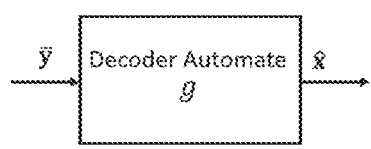
FIG. 7 illustrates a decoder automate.

This can be illustrated as shown in FIG. 7 where received set of symbols $\overline{y}$ can be written as buffered received set of systematic and parity symbols during phase 1 and 2 with $$\overline{y}=[\overline{y}_1 \, \overline{y}_2 \ldots \overline{y}_K] \quad (7)$$

More precisely $\overline{y}_{k'}$ with $1 \leq k' \leq K$ contains the buffered received set of systematic and parity symbols after finalizing the two step encoding procedure given by phase 1 and 2.

The second generator device 302 is in examples a RNN, e.g. a GRU-bidirectional, which processes over entire received buffer to obtain estimated symbols $\hat{x}_{k'}$ corresponding to each received $\hat{y}_{k'}$ with $1 \leq k' \leq K$ shown below $$\hat{x}=[\hat{x}_1 \, \hat{x}_2 \ldots \hat{x}_K] \quad (8)$$

The second generator device 302 may use a bi-directional GRU to decode received codeword. Indeed, bidirectional GRU benefits the follow of information in both directions as in this structure there are two RNNs stacked one on top of other providing higher reliability. Bi-directional GRU could be one layer or two layer GRU.

The second generator device 302 may be defined by a list of states, its initial state and the inputs that trigger transition to another state. The initial state of automaton may be set to zero.

In the following, an encoder architecture of the first communication device 100 and a decoder architecture of the second communication device 300 will be explained more in detail.

FIG. 8 shows a proposed encoder architecture of the first communication device 100 according to example embodiments. The first generator device 102 comprises a recurrent neural network including a one layer (or two layer) gated recurrent unit 122, a linear transformer 124 and a linear activation function 126. Contrary to conventional solutions, the activation function 126 is a linear activation that permits in practice to have parity symbols with larger values without saturation and also reduced complexity compared to non-linear activation function. The parity symbols are further normalized to obtain zero mean and unit variance sequence to be transmitted. After normalization, an optional power allocation unit allocates the power among the transmitted systematic and parity symbols which is not shown in FIG. 8.

Mathematically, the new input to the encoder for time instant k denoted as $I_k$ can be written as in the following:

$$I_k = \begin{bmatrix} x_k \\ \tilde{X}_k - X_k \\ \tilde{Q}_{k-1} - Q_{k-1} \end{bmatrix} \quad (9)$$

with $x_k$ being the information symbol of instant k and $\tilde{X}_k - X_k$ being the vector of noise on systematic symbols of size $\Delta^{tx}+1$ with $\Delta^{tx}$ being an integer, i.e. $\Delta^{tx} \geq 0$.

Let's denote herein the vector $X_k$ of size $\Delta^{tx}+1$ as the vector containing systematic symbols of time instant k to time instant $k-\Delta^{tx}$ systematic symbols, we use the notation below:

$$X_k=[x_k \, x_{k-1} \ldots x_{k-\Delta^{tx}}]^T = x_{k-\Delta^{tx}:k} \quad (10)$$

where T denotes transpose operation.

We denote by Xx the vector of size $\Delta^{tx}+1$ containing received set of systematic symbols of time instant k to time instant $k-\Delta^{tx}$ received systematic symbols over the feedback channel.

According to the above notation we have:

$$\tilde{X}_k = \tilde{x}_{k-\Delta^{tx}:k} \quad (11)$$

Therefore, the noise on the set of systematic symbols at time instant k to time instant $k-\Delta^{tx}$ received noise on systematic symbols can be denoted as $\tilde{X}_k - X_k$. The obtained vector $\tilde{X}_k - X_k$ may be of size $\Delta^{tx}+1$.

We can see that parameter $\Delta^{tx}$ corresponds to a time window defined over systematic symbols. Actually, it can be seen that the first element of vector $\tilde{X}_k - X_k$ is the noise on the set of systematic symbols at time instant k and the following elements denote $\Delta^{rx}$ previously received systematic symbols, or the noise on systematic symbols of time instants k−1, k−2, ..., k−$\Delta^{rx}$, used herein.

Let's denote the vector of $l^{th}$ parity symbol with $1 \leq l \leq P$ of instant k−1 to k−$\gamma_l^{rx}$ received parity symbols with $\gamma_l^{rx} \geq 0$ as $Q_{k-1,l}$. Following the notation introduced above we have:

$$Q_{k-1,l} = p_{k-1-\gamma_l^{rx}:k-1,l} \tag{12}$$

In the above equation, the first element denotes the $l^{th}$ parity symbol of time instant k−1 and the following elements denotes $l^{th}$ parity symbols up to time instant k−1−$\gamma_l^{th}$.

We also denote $\tilde{Q}_{k-1,l}$ as the $l^{th}$ parity symbol of noisy received vector of time instant k−1 to k−$\gamma_l^{th}$ noisy received parity symbols with $\gamma_l^{rx} \geq 0$. We can write $$\tilde{Q}_{k-1,l} = \tilde{p}_{k-1-\gamma_l^{rx}:k-1,l} \tag{13}$$

We thus create the vector $\tilde{Q}_{k-1}$ by stacking all the obtained column vectors with l=1, 2, ..., P where P is the number of generated parity symbols per information bits. We therefore have:

$$\tilde{Q}_{k-1} = \begin{bmatrix} \tilde{Q}_{k-1,1} \\ \tilde{Q}_{k-1,2} \\ \vdots \\ \tilde{Q}_{k-1,P} \end{bmatrix} \tag{14}$$

We can write similar equations for $Q_{k-1,l}$ with l=1, 2, ..., P to obtain $Q_{k-1}$ $$Q_{k-1} = \begin{bmatrix} Q_{k-1,1} \\ Q_{k-1,2} \\ \vdots \\ Q_{k-1,P} \end{bmatrix} \tag{15}$$

Therefore, the vector $\tilde{Q}_{k-1} - Q_{k-1}$ denotes the noise on parity symbols at time instant k−1 to k−1−$\delta_l^{rx}$ previous time instants being k−2, k−3 ..., k−1−$\gamma_l^{rx}$. The size of this vector is P+$\Sigma_l \gamma_l^{rx}$. We can see that $\gamma_l^{rx}$ corresponds to a time window defined over $l^{th}$ parity symbol in the first communication device 100.

Figure 9:
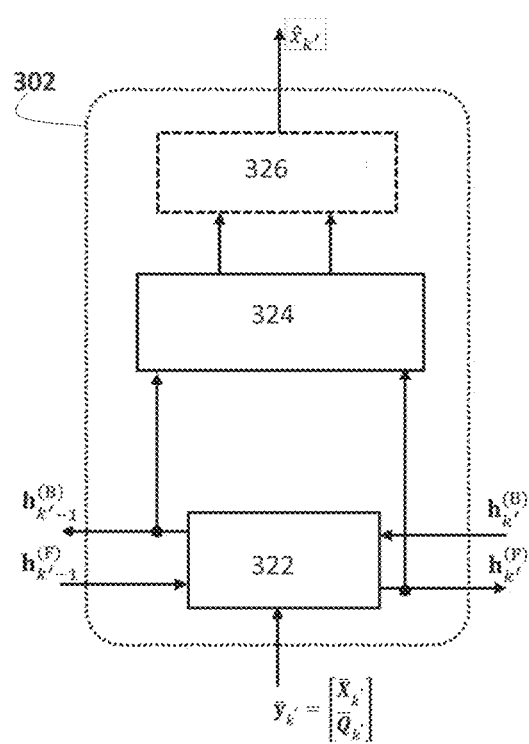
FIG. 9 illustrates a second generator device according to an example embodiment.

FIG. 9 shows the proposed decoder architecture of the second communication device 300 more in detail. The second generator device 302 may be as previously stated a RNN including a bi-directional one layer gated recurrent unit 322, a linear transformer 324 and a linear activation function 326. The second generator device 302 contains in examples only one layer of bi-directional GRU cell, which leads to smaller number of variables to be trained and processed compared to conventional solutions that is using two layer bidirectional GRU-thus has the advantage of having considerably lower computational complexity. As for the activation function 326, it may be replaced with a linear function as for the corresponding encoder of the first communication device 100 thus permitting higher dynamic for output and less complex implementation.

The input to the second generator device 302 at time instant k' with $1 \leq k' \leq K$ buffered received parity and systematic symbol can be denoted as $\bar{y}_{k'}$ with:

$$\bar{y}_{k'} = \begin{bmatrix} \bar{X}_{k'} \\ \bar{Q}_{k'} \end{bmatrix} \tag{16}$$

with:

$$\bar{X}_{k'} = \bar{x}_{k'-\Delta^{rx}:k'} \tag{17}$$

It can be seen that the first element of $\bar{X}_{k'}$ is received systematic symbols in time instant k' and following elements denotes $\Delta^{rx}$ received systematic symbols prior to time instant k'. $\bar{X}_{k'}$ is a vector of size $(\Delta^{rx}+1) \times 1$ assuming that we have taken into account $\Delta^{rx}$ integer values, with $\Delta^{rx} \geq 0$. We can see that parameter $\Delta^{rx}$ corresponds to a time window defined over received systematic symbols.

Let's denote with $\bar{p}_{k'-\gamma_l^{rx}:k',l}$ the vector of $l^{th}$ received parity symbol of instant k' and $\gamma_l^{rx}$ previously received parity symbols with $\gamma_l^{rx} \geq 0$. More precisely $\bar{p}_{k'-\gamma_l^{rx}:k',l}$ denotes the vector of $l^{th}$ received noisy parity symbol of time instant k' to instant k'−$\gamma_l^{rx}$. We can write:

$$\bar{Q}_{k',l} = \bar{p}_{k'-\gamma_l^{rx}:k',l} \tag{18}$$

The vector $\bar{Q}_{k'}$ can be by stacking all the column vectors with l=1, 2, ..., P where P is the number of generated parity symbols per information bits respectively. We therefore have vector $\bar{Q}_{k'}$ as:

$$\bar{Q}_{k'} = \begin{bmatrix} \bar{Q}_{k',1} \\ \bar{Q}_{k',2} \\ \vdots \\ \bar{Q}_{k',P} \end{bmatrix} \tag{19}$$

The vector in eq. (19) is of size P+$\Sigma_l \gamma_l^{rx}$. We can see that $\gamma_l^{rx}$ corresponds to a time window defined over $l^{th}$ parity symbol in the receiver.

Complexity Evaluation

The elementary neural network used in the above examples for the first communication device 100 and the second communication device 300 is a (one layer or two layer) gated recurrent unit that uses gating mechanism to follow and manage the flow of information between cells in the neural network proposed for the first time by Choi in 2014. The structure of the GRU permits to capture dependencies from large sequences of data without discarding information from earlier parts of sequences using a gating principle.

Operations performed inside the GRU unit can be written as:

$$r_k = \sigma(W_{ir} I_k + b_{ir} + W_{hr} h_{k-1} + b_{hr}) \tag{20}$$

$$z_k = \sigma(W_{iz} I_k + b_{iz} + W_{hz} h_{k-1} + b_{hz}) \tag{21}$$

$$n_k = \tan h(W_{in} I_k + b_{in} + r_k * (W_{hh} h_{k-1} + b_{hn})) \tag{22}$$

$$h_k = (1 - z_k) * n_k + z_k * h_{k-1} \tag{23}$$

where $h_k$ of size K×1 is the hidden state at time instant k, $I_k$ is the input at time instant k, $h_{k-1}$ is the hidden state of the layer at time instant k−1 or the initial hidden state at time instant 0 denoted by $h_0$ and $r_k$, $z_k$, $n_k$ are the reset, update and new gates, respectively. $\sigma$ is the sigmoid function; * is the Hadamard product; and $W_{xy}$ and $b_{xy}$ denote trained parameters.

The update gate and reset gate compute the output by using current input data and previous hidden state. The update gate and reset gate also control how much of the past information needs to be retained for the future steps.

In a multi-layer GRU, the input $I_k^{(l)}$ of the l-th layer (l≥2) is the hidden state $h_k^{(l-1)}$ of the previous layer.

As for the linear transform that applies a linear transformation to the output state data $h_k$ of size K×1, we can write as captured in FIGS. 8 and 9:

$$P_k = A_k h_k + b_k \quad (24)$$

where $A_k$ and $b_k$ denotes the trained parameters.

Computational complexity of the GRU and linear transform are computed by counting the size and total number of variables to be trained. It can be seen that the complexity of encoder and decoder are dominated by size of hidden state $h_k$ and trained parameters of the same size. The number of trained variables is of order of $K^3$ as shown in Table 1. This value becomes considerable even for moderate value of information symbols/bits K.

TABLE 1

Number of trained variables used for encoder and decoder

| | Number of trained variables |
|---|---|
| Two layer GRU encoder and linear transform | ≈6K³ |
| One layer GRU encoder and linear transform | ≈3K³ |
| Decoder (Bi-directional GRU - two layers) | ≈12K³ |

The total number of trained variables used for encoding and decoding for one layer GRU encoder and a two layer bi-directional GRU decoder is ≈15K³, compared to ≈18K³ when two layer GRU is used.

The proposed solution requires higher dimension for input variables to recurrent neural network in the encoder and decoder. However, the computational complexity is still dominated by the size of hidden state as parameters $\Delta^{tx}$, $\Delta^{rx}$, $\gamma^{tx}$, $\gamma^{rx} \ll K$. The proposed solution permits to use a one layer bi-directional GRU decoder which has considerable less computational complexity compared to the two-layer bi-directional GRU decoder of convention solutions.

It can be seen with reference to Table 1 that for the case proposed above using one layer GRU encoder and one layer bi-directional GRU decoder we have a total computational complexity of 3K³+6K³=9K³. This is about 40% to 50% less computational complexity compared to conventional solutions which has the computational complexity of 15K³ and 18K³, respectively.

Extension to Higher Order Modulation

Figure 10:
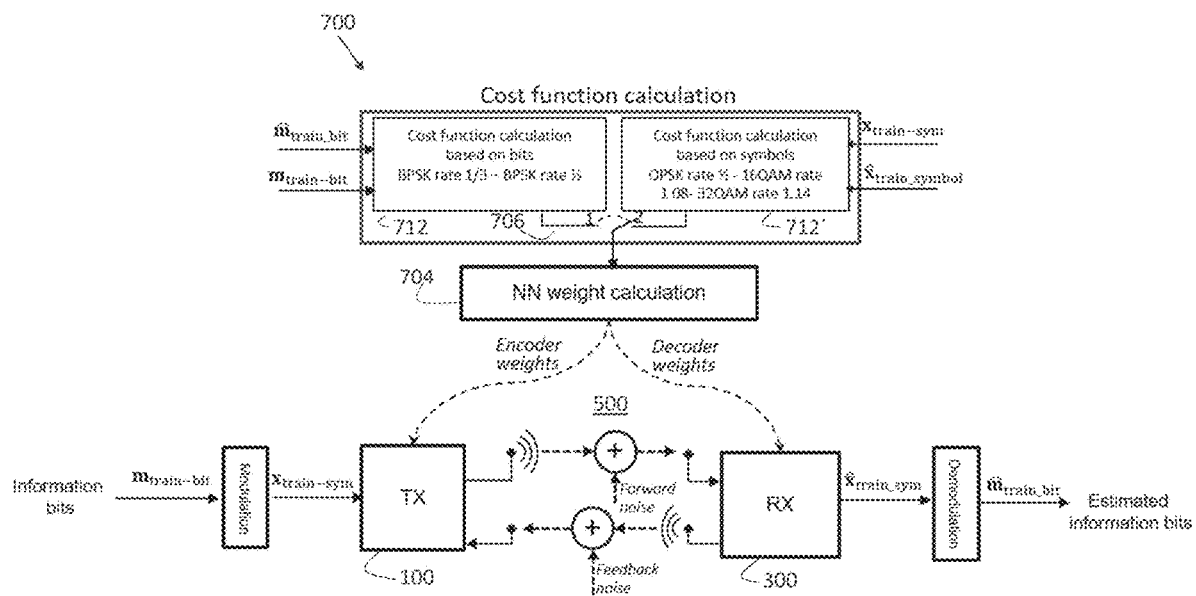
FIG. 10 shows a functional block diagram for training procedure.

FIG. 10 shows a functional block diagram for codes with higher SE showing training procedure. It is noted that both the encoder of the first communication device 100 and the decoder of the second communication device 300 are trained jointly.

The training procedure device 700 comprises a cost function calculator 702, a neural network (NN) weight calculator 704 and a switch 706 configured to switch the NN weight calculator block 704 between first 712 and second 712' cost function calculators in dependency on input from the NN weight calculator 704.

When BPSK modulation is used for systematic symbols, training is performed using binary cross-entropy as the cost function, i.e. the first cost function calculator 612. The input to the loss function in this case is actual and estimated information bits, denoted with $m_{train-bit}$ and $\hat{m}_{train-bit}$ respectively in FIG. 10, with the illustrated switch 606 being in position 1 that indicates the cost function calculation used for BPSK modulation.

However, for higher order modulation, e.g. when QPSK, 16 QAM or 32 QAM is used for systematic symbols, training is done using minimum square error as cost function over input and estimated non-binary symbols, denoted with $x_{train-sym}$ and $\hat{x}_{train-sym}$ respectively in FIG. 10, instead of binary bits. This corresponds to the illustrated switch 606 being is position 2 indicating that cost function calculation is performed over input symbols instead of bits, i.e. in the second cost function calculator 612'.

For example, when conventional 16 QAM is used to modulate information bits to systematic symbols, information bits are mapped to equivalent 4 PAM real and imaginary symbols and are combined into one complex symbol.

In the general case, rectangular QAM signal constellations have the distinct advantage of being easily generated as PAM signals impressed in phase-quadrature carriers. For rectangular signal M-QAM constellations in which M=2$^l$ where l is even, the QAM signal constellation is equivalent to two PAM signals on quadrature carriers, each having $\sqrt{M}=2^{l/2}$ signal points.

Consequently, for higher order modulation, real parity symbols are generated by the encoder based on transmitted PAM systematic symbols and received PAM systematic symbols through the second channel 520. Two consecutive real parity symbols are combined into one complex symbol. The RNN memory in this case is reduced to K=L/l with l being the size of equivalent PAM modulation as L being the number of information bits.

The decoder is modified as well to avoid scaling of non-binary symbols when performing decoding. For encoding and transmission, parity and systematic symbols are in examples further normalized to obtain zero mean and unit variance sequence to transmit.

The cost function calculation unit is a generic unit that can be found in any neural network system applying minimum square error or binary cross entropy measures to the inputs that are chosen as described above by position of the illustrated switch. The NN weight calculation block contains the final weight obtained at the end of the training procedure.

The linear transform shown in Eq. (24) applies a linear transformation to the output state $h_k$ of size K×1, to produce parity symbols sequence of size P. It is therefore possible to generate different size of parity symbol sequence and train the system consequently, using the same output state $h_k$ by modifying the size of output (the size of trainable parameter $A_k$).

Therefore, a puncturing or repetition pattern can be envisaged for the same output state $h_k$.

More precisely, the size of $A_k$ is P×K with P that can be adjusted. For instance, with P=2 two parity symbols per information bit would be generated resulting in a code of rate considering systematic bits. For P=1 one parity symbol per information bit could be generated resulting in a code of rate-thus enable puncturing.

Signaling Aspects

As previously discussed, the encoder and decoder are trained jointly. When proposed codes are transmitting/receiving data or even during training, both the first communication device 100 and the second communication device 100 should have the same knowledge about the design parameters that we call herein also call signalling parameters. The design parameters changes when system requirements such as MCS, rate or spectral efficiency (SE) are changing.

System requirements mentioned above for deep learning encoders and decoders can be defined by selecting deep learning codes with variable rates in a way to have the same SE as conventional codes and SE may be defined as below:

$$SE = \frac{L}{N_{RE}} \quad (25)$$

where $N_{RE}$ presents the number of resource elements (or complex symbols) used to transmit obtained the codeword and L is the number of information bits.

New requirement can be potentially considered, such as rate of SIC codes denoted as $R_{SIC}$ defined as below:

$$R_{SIC} = \frac{L}{2N_{RE}} \quad (26)$$

These parameters can in examples be signalled to both the first communication device 100 and the second communication device 300 via a controller 600 as illustrated in FIG. 5. The controller 600 can be placed or be located physically in the same device as the first communication device 100 or in the second communication device 300.

In examples, the parameters can be signalled from the first communication device 100 in a control message 610 to the second communication device 300. In one example the control message 610 indicates parameters K and P. In other words, the first communication device 100 is configured to transmit a control message 610 to the second communication device 300, wherein the control message 610 indicates K and P. Correspondingly, the second communication device 300 is configured to receive the control message 610 from the first communication device 100, wherein the control message 610 indicates parameters K and P.

In further examples, the control message 610 further indicates a first parameter $\Delta^{rx}$ denoting a time window for received systematic symbols and a second parameter $\gamma_l^{rx}$ denoting a time window for received parity symbols.

In yet further examples, the parameters can be pre-configured by a standard, such as LTE and NR, and known to the first communication device 100 and the second communication device 300.

A non-exhaustive list of previous and further design parameters is given in Table 2. These parameters can be dynamically signalled in, one or more control messages, each transmission time interval based on system requirements, such as target modulation order, SIC code rate and spectral efficiency are changing fast, or be semi statically or statically configured or pre-configured when the system requirements are slowly changing.

TABLE 2 parameters to signal as a function of system requirements
Parameters to signal from controller to both Rx and Tx $\Delta^{tx}$
$\Delta^{rx}$
$\gamma_l^{tx}$ with $1 \leq l \leq P$
$\gamma_l^{rx}$ with $1 \leq l \leq P$
P parity bits - puncturing/repetition pattern
Type of RNN in Rx/Tx
(e.g. GRU, RNN) - bidirectional - number
of layers - activation function (linear, nonlinear)
K
Code-word level -bit level weights (if any)

Codeword level or bit level weights mentioned above stands for potential scalar trainable weights applied on systematic symbols/bits or parity symbols while keeping a constant average transmitted power constraint. Those trainable weights could be signalled to be equal for all the parity bits or could be considered to be different.

Figure 11:
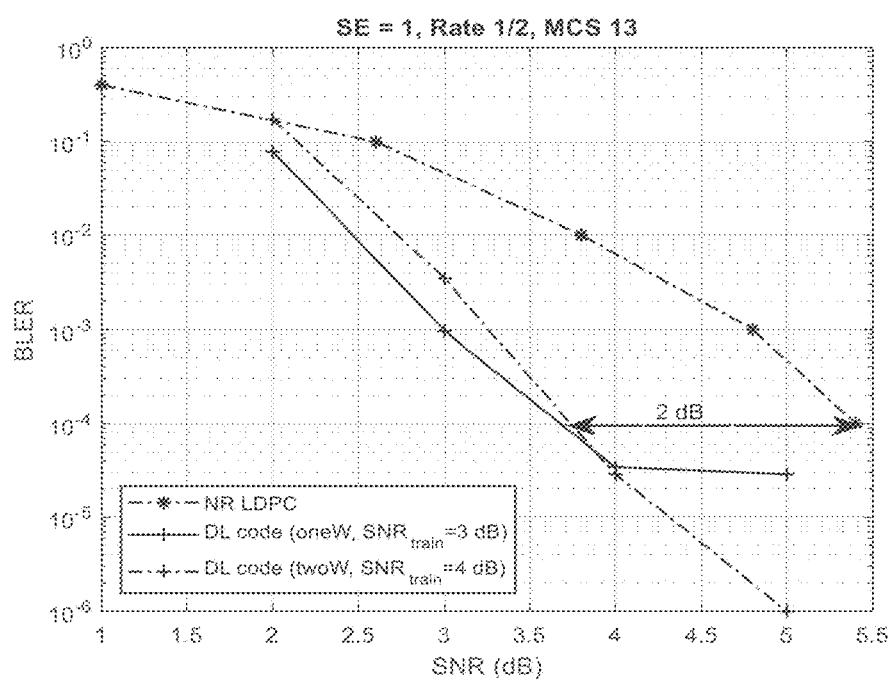
FIGS. 11-14 show performance results for examples embodiment.

FIG. 11 shows performance for higher order modulation corresponding to MCS 13 for NR obtained from above procedure. The evaluation assumptions are shown in Table 3. It can be seen that the obtained code performs uniformly better than NR-LDPC code for SNR above 2 dB. For instant this gain is about 2 dB for BLER=$10^{-4}$.

TABLE 3

Simulation assumptions

| Evaluation assumptions | SIC code | NR codes |
| --- | --- | --- |
| Message length K | 50 bits | 48 bits |
| Complex symbols | 50 symbols | 48 QPSK symbols |
| Code rate | 1/2 | ½ |
| Nb. of parity symbols per inf. Bit P | 1 symbol | — |
| Forward channel | AWGN, same SNR for training and eval. | AWGN |
| Echo channel | Noise-less | — |
| SNR train dB (when applicable) | 3, 4 | — |
| Further assumptions | Power allocation and one symbol zero padding | — |
| Training length | $5 \times 10^6$ | — |

Simulation Results for a Proposed Architecture

A proposed iterative code design is also evaluated for P=2 rate 1/3 and different modulation orders considered to modulate systematic symbols. Training procedure and other simulation parameters are considered as described above.

For these evaluations we have considered that $\Delta^{tx} = \gamma_l^{tx}$ for the first communication device 100. Table 4 shows detailed chosen parameters for the first communication device 100.

TABLE 4

Transmitter for rate 1/3 (BPSK, QPSK and 16QAM)

| | $\tilde{x}_{k,\Delta^{tx}} - x_{k,\Delta^{tx}}$ | $\tilde{p}^1_{k-1,\Delta^{tx}} - p^1_{k-1,\Delta^{tx}}$ | $\tilde{p}^2_{k-1,\Delta^{tx}} - p^2_{k-1,\Delta^{tx}}$ |
| --- | --- | --- | --- |
| $\Delta^{tx}$ (symbol) | 1 | 1 | 0 |

Receiver parameters for the second communication device 300 are shown in Table 5 where $\Delta^{rx}=\gamma_l^{rx}$ for the second communication device 300.

TABLE 5

Receiver for rate 1/3 (BPSK, QPSK and 16QAM) - one layer bi-directional

| | | $\tilde{x}_{k,\Delta^{rx}}$ | $\tilde{p}^1_{k,\Delta^{rx}}$ | $\tilde{p}^2_{k,\Delta^{rx}}$ |
| --- | --- | --- | --- | --- |
| First receiver | $\Delta^{rx}$ (symbol) | 1 | 1 | 1 |
| Second receiver | $\Delta^{rx}$ (symbol) | 2 | 0 | 0 |

Figure 12:
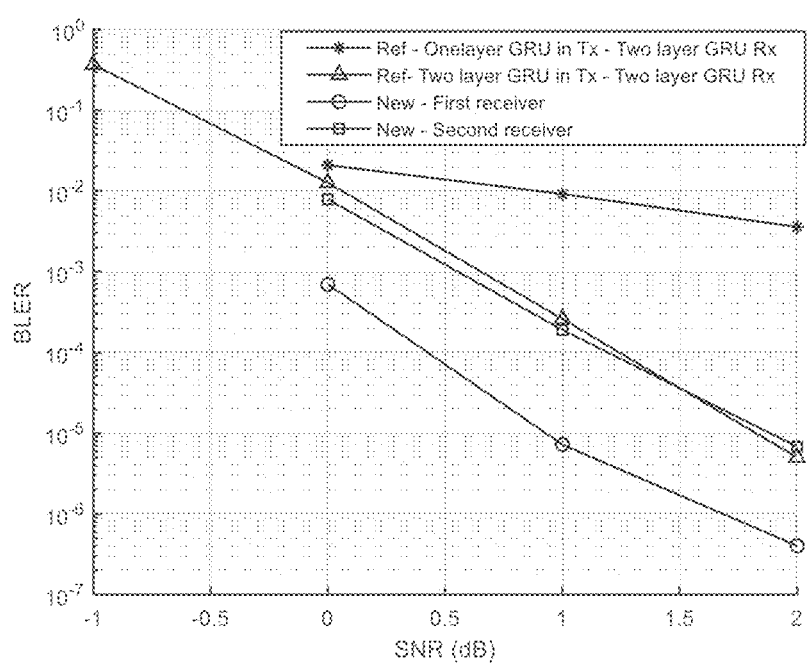
Figure 13:
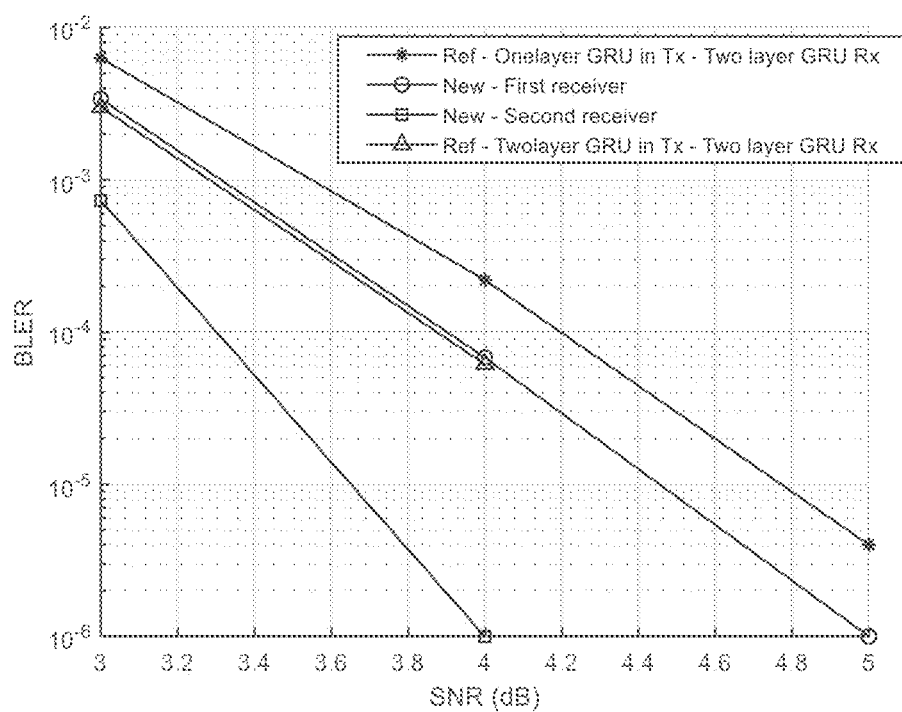
Figure 14:
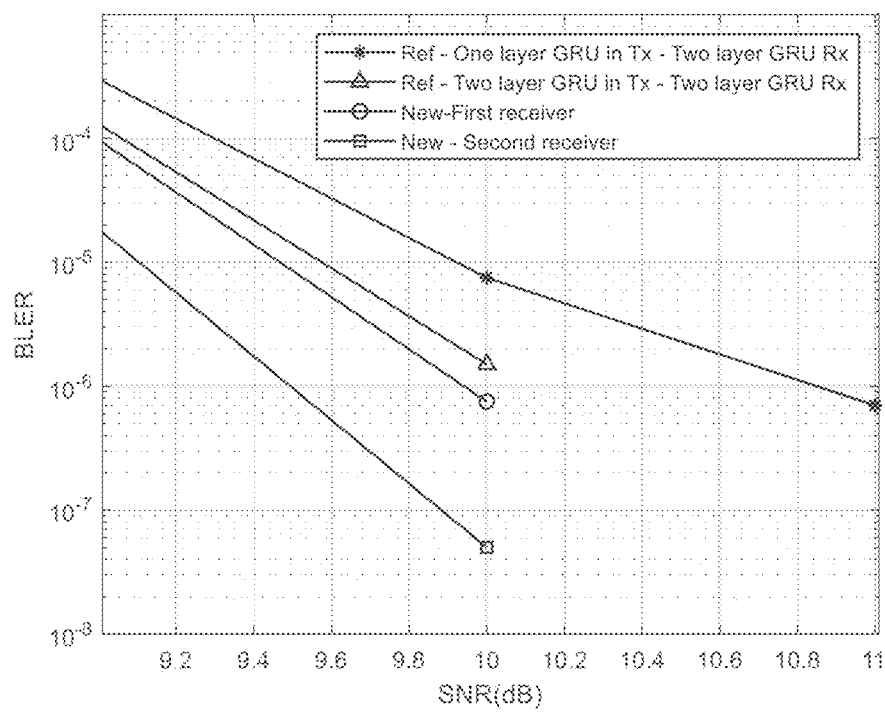

FIG. 12 shows BLER versus SNR for BPSK rate 1/3-training SNR=0 dB. FIG. 13 shows BLER versus SNR for QPSK rate 1/3-training SNR=4 dB. FIG. 14 shows BLER versus SNR for 16QAM rate 1/3-training SNR 10 dB.

In the FIGS. 12-14 star marked curves present the reference case where architecture according to conventional solutions is used. In this case one layer GRU was used in the first communication device 100 and a two layer bi-directional GRU in the second communication device 300. Triangle marked curve shows the same reference using conventional architecture with a two layer GRU in the first communication device 100 side with higher computational complexity as explained above. Square marked curves show the new proposed architecture. Both new architectures in the first communication device 100 are using a one layer GRU with the delayed version of input as captured in Table 4. Indeed, the new architecture used for the first communication device 100 is uniformly designed leading to a generic architecture.

Two different second communication devices are tested for the new code design and architecture used in the first communication device 100 as captured in Table 5. A second communication device uses one delayed version of received systematic bits/symbols and both parity symbols. Another second communication device uses only shifted version of systematic bits/symbols by one time delay and two time delays. Both second communication devices are using one layer bi-directional GRU architecture which is considerably less complex compared to a two layer architecture.

Performance evaluation shows that the encoder and decoder architecture of the first 100 and second 300 communication devices, respectively, according to the solution can achieve one order of magnitude BLER gain compared to conventional solutions with half of the computational complexity of the conventional solutions.

Furthermore, any method according to example embodiments may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that examples of the first communication device 100 and the second communication device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device 100 and the second communication device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the examples described above, but also relates to and incorporates all examples within the scope of the appended independent claims.

What is claimed is:

1. A first communication device for a wireless communication system, wherein the first communication device is configured to:
   obtain a first set of noise values based on a set of systematic symbols transmitted in a first channel to a second communication device and a set of corresponding systematic symbols received in a second channel from the second communication device, wherein the set of corresponding systematic symbols is an echoed back version of the set of systematic symbols, wherein the set of systematic symbols is obtained based on modulating a set of information bits of a set of information symbols, and wherein the set of systematic symbols is indexed from k=1, 2, . . . , K, and wherein k is an integer;
   perform, for k=1:
      generate a first set of parity symbols $P_1$ using a first generator device and based on a first systematic symbol in the set of systematic symbols and a first noise value in the first set of noise values,
      transmit the first set of parity symbols $P_1$ in the first channel to the second communication device, and
      receive a first set of corresponding parity symbols $\tilde{P}_1$ in the second channel from the second communication device; and
   perform, for k=2, . . . , K:
      obtain a k−1th set of noise values based on a set of k−1th transmitted parity symbols $P_{k-1}$ and a set of k−1th received parity symbols,
      generate a k-th set of parity symbols $P_k$ using the first generator device and based on a k-th systematic symbol, k-th to k−$\Delta^{tx}$th noise values in the first set of noise values, and k−1 to k−1−$\gamma_l^{tx}$th sets of noise values, wherein $\Delta^{tx}$ and $\gamma_l^{tx}$ are integers, $\Delta^{tx}$ denotes a time window for transmitted systematic symbols, $\gamma_l^{tx}$ denotes a time window for transmitted parity symbols, and $\gamma_l^{tx}$ corresponds to an l-th parity symbol, wherein l=1, 2, . . . , P and P is a number of parity symbols per information bit of the set of information bits,
      transmit the k-th set of parity symbols $P_k$ in the first channel to the second communication device, and
      receive a k-th set of corresponding parity symbols $\tilde{P}_k$ in the second channel from the second communication device,
   wherein the K-th set of parity symbols enables the second communication device to jointly decode the set of systematic symbols and the K-th set of parity symbols.

2. The first communication device according to claim 1, wherein at least one of:
   $\Delta^{tx}$ is equal to 1, and
   $\gamma_1^{tx}$ is equal to 1 and $\gamma_2^{tx}$ is equal to 0 when P is equal to 2.

3. The first communication device according to claim 1, wherein the first generator device is configured to generate the k-th set of parity symbols $P_k$ further based on a previous time instant ($h_{k-1}$) of the first generator device.

4. The first communication device according to claim 3, wherein the first generator device is a recurrent neural network including a one layer gated recurrent unit, a linear transformer, and a linear activation function.

5. The first communication device according to claim 1, configured to transmit a control message to the second communication device, wherein the control message indicates K and P.

6. The first communication device according to claim 5, wherein the control message further indicates a first parameter $\Delta^{rx}$ denoting a time window for received systematic symbols and a second parameter $\gamma_l^{rx}$ denoting a time window for received parity symbols.

7. A second communication device for a wireless communication system, the second communication device being configured to:
receive a set of systematic symbols in a first channel from a first communication device, wherein the set of systematic symbols is obtained based on modulating a set of information bits of a set of information symbols, and wherein the systematic symbols are indexed from k=1, 2, . . . , K, and wherein k is an integer,
transmit the set of received systematic symbols in a second channel to the first communication device; and
perform, for k=1, 2, . . . , K:
receive a k-th set of parity symbols $P_k$ in the first channel from the first communication device,
transmit a k-th set of corresponding parity symbols $\tilde{P}_1$ in the second channel to the first communication device, and
determine a k-th information symbol using a second generator device and based on k-th to k–$\Delta^{rx}$th received systematic symbols and k-th to k–$\gamma_l^{rx}$th received parity symbols, wherein $\Delta^{rx}$ and $\gamma_l^{rx}$ are integers, $\Delta^{rx}$ denotes a time window for transmitted systematic symbols, $\gamma_l^{rx}$ denotes a time window for transmitted parity symbols, and $\gamma_l^{rx}$ corresponds to an l-th parity symbol, wherein l=1, 2, . . . , P, and P is a number of parity symbols per information bit of the set of information bits,
wherein the K-th set of parity symbols enables the second communication device to jointly decode the set of systematic symbols and the K-th set of parity symbols.

8. The second communication device according to claim 7, wherein at least one of
$\Delta^{rx}$ is equal to 1 or 2, and
$\gamma_1^{rx}$ is equal to 0 or 1, and $\gamma_2^{rx}$ is equal to 0 or 1 when P is equal to 2.

9. The second communication device according to claim 7, wherein the second generator device is configured to determine the k-th information symbol further based on a previous time instant ($h_{k-1}$) and a consecutive time instant ($h_{k+1}$) of the second generator device.

10. The second communication device according to claim 9, wherein the second generator device is a recurrent neural network including a bi-directional one layer gated recurrent unit, a linear transformer, and a linear activation function.

11. The second communication device according to claim 7, configured to receive a control message from the first communication device, wherein the control message indicates K and P.

12. The second communication device according to claim 11, wherein the control message further indicates a first parameter $\Delta^{rx}$ denoting a time window for received systematic symbols and a second parameter $\gamma_l^{rx}$ denoting a time window for received parity symbols.

13. A method for a first communication device, the method comprising:
obtaining a first set of noise values based on a set of systematic symbols transmitted in a first channel to a second communication device and a set of corresponding systematic symbols received in a second channel from the second communication device, wherein the set of corresponding systematic symbols is an echoed back version of the set of systematic symbols, wherein the set of systematic symbols is obtained based on modulating a set of information bits of a set of information symbols, and wherein the set of systematic symbols is indexed from k=1, 2, . . . , K, and wherein k is an integer;
performing, for k=1:
generating a first set of parity symbols $P_1$ using a first generator device and based on a first systematic symbol in the set of systematic symbols and a first noise value in the first set of noise values,
transmitting the first set of parity symbols $P_1$ in the first channel to the second communication device, and
receiving a first set of corresponding parity symbols $\tilde{P}_1$ in the second channel from the second communication device; and
performing, for k=2, . . . , K:
obtaining a k–1th set of noise values based on a set of k–1th transmitted parity symbols $P_{k-1}$ and a set of k–1th received parity symbols,
generating a k-th set of parity symbols $P_k$ using the first generator device and based on a k-th systematic symbol, k-th to k–$\Delta^{rx}$th noise values in the first set of noise values, and k–1 to k–1–$\gamma_l^{rx}$th sets of noise values, wherein $\Delta^{rx}$ and $\gamma_l^{rx}$ are integers, $\Delta^{rx}$ denotes a time window for transmitted systematic symbols, $\gamma_l^{rx}$ denotes a time window for transmitted parity symbols, and $\gamma_l^{rx}$ corresponds to an l-th parity symbol, wherein l=1, 2, . . . , P and P is a number of parity symbols per information bit of the set of information bits,
transmitting the k-th set of parity symbols $P_k$ in the first channel to the second communication device, and
receiving a k-th set of corresponding parity symbols $\tilde{P}_k$ in the second channel from the second communication device,
wherein the K-th set of parity symbols enables the second communication device to jointly decode the set of systematic symbols and the K-th set of parity symbols.

14. A method for a second communication device, the method comprising:
receiving a set of systematic symbols in a first channel from a first communication device, wherein the set of systematic symbols is obtained based on modulating a set of information bits of a set of information symbols, and wherein the systematic symbols are indexed from k=1, 2, . . . , K, and wherein k is an integer;
transmitting the set of received systematic symbols in a second channel to the first communication device; and
performing, for k=1, 2, . . . , K:
receiving a k-th set of parity symbols $P_k$ in the first channel from the first communication device,
transmitting a k-th set of corresponding parity symbols $\tilde{P}_1$ in the second channel to the first communication device, and
determining a k-th information symbol using a second generator device and based on k-th to k–$\Delta^{rx}$th received systematic symbols and k-th to k–$\gamma_l^{rx}$th received parity symbols, wherein $\Delta^{rx}$ and $\gamma_l^{rx}$ are integers, $\Delta^{tx}$ denotes a time window for transmitted systematic symbols, $\gamma_l^{tx}$ denotes a time window for transmitted parity symbols, and $\gamma_l^{tx}$ corresponds to an l-th parity symbol, wherein l=1, 2, . . . , P, and P is a number of parity symbols per information bit of the set of information bits, wherein the K-th set of parity symbols enables the second communication device to jointly decode the set of systematic symbols and the K-th set of parity symbols.

\* \* \* \* \*